(12) United States Patent
Liu

(10) Patent No.: US 11,838,419 B2
(45) Date of Patent: Dec. 5, 2023

(54) METHOD AND SYSTEM FOR MONITORING INDUSTRIAL DEVICES

(71) Applicant: DELTA ELECTRONICS, INC., Taoyuan (TW)

(72) Inventor: Chia-Hung Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 303 days.

(21) Appl. No.: 17/447,694

(22) Filed: Sep. 14, 2021

(65) Prior Publication Data

US 2022/0231849 A1     Jul. 21, 2022

(30) Foreign Application Priority Data

Jan. 15, 2021   (CN) .......................... 202110055442.6

(51) Int. Cl.
| | | |
|---|---|---|
| *H04L 9/32* | (2006.01) | |
| *H04L 67/02* | (2022.01) | |
| *H04L 67/1097* | (2022.01) | |
| *H04L 67/1001* | (2022.01) | |

(52) U.S. Cl.
CPC .......... *H04L 9/3213* (2013.01); *H04L 9/3263* (2013.01); *H04L 67/02* (2013.01); *H04L 67/1001* (2022.05); *H04L 67/1097* (2013.01)

(58) Field of Classification Search
CPC ...... H04L 9/3213; H04L 9/3263; H04L 67/02
See application file for complete search history.

(56) References Cited

U.S. PATENT DOCUMENTS

| | | |
|---|---|---|
| 2015/0324568 A1 | 11/2015 | Publicover et al. |
| 2015/0358667 A1 | 12/2015 | Bhatia et al. |
| 2016/0379165 A1 | 12/2016 | Moakley |
| 2017/0192414 A1 | 7/2017 | Mukkamala et al. |
| 2019/0041824 A1 | 2/2019 | Chavez et al. |
| 2019/0041830 A1 | 2/2019 | Yarvis et al. |
| 2019/0042378 A1 | 2/2019 | Wouhaybi et al. |
| 2019/0260781 A1 | 8/2019 | Fellows et al. |
| 2020/0145213 A1* | 5/2020 | Mohan ................. H04L 63/102 |
| 2021/0160070 A1* | 5/2021 | Herrero ................ H04L 63/166 |

(Continued)

FOREIGN PATENT DOCUMENTS

| | | |
|---|---|---|
| CN | 109314694 A | 2/2019 |
| TW | 201140475 A1 | 11/2011 |
| TW | 201241763 A | 10/2012 |

(Continued)

*Primary Examiner* — Nelson S. Giddins
(74) *Attorney, Agent, or Firm* — CKC & Partners Co., LLC

(57) ABSTRACT

A method for monitoring industrial devices includes: obtaining an access token of a cloud storage server by a management device; sending a certificate request message to the management device by a user apparatus; performing a certificate verification on the user apparatus by the management device according to the certificate request message, and sending a certificate pass message with the access token to the user apparatus by the management device after passing the certificate verification; sending an access request message with the access token and identification information to the cloud storage server by the user apparatus; and providing device data of an industrial device terminal to the user apparatus by the cloud storage server according to the access token and a privilege of the identification information.

15 Claims, 7 Drawing Sheets

(56) References Cited

U.S. PATENT DOCUMENTS

2021/0377047 A1* 12/2021 Haque ................... H04L 9/3268

FOREIGN PATENT DOCUMENTS

| | | |
|---|---|---|
| TW | 1586943 B | 6/2017 |
| TW | 201723880 A | 7/2017 |
| TW | 201727439 A | 8/2017 |
| TW | 1623839 B | 5/2018 |
| TW | 201835784 A | 10/2018 |
| TW | 1649662 B | 2/2019 |
| TW | 1671692 B | 9/2019 |
| TW | 1673583 B | 10/2019 |
| TW | 201945970 A | 12/2019 |

* cited by examiner

METHOD AND SYSTEM FOR MONITORING INDUSTRIAL DEVICES

RELATED APPLICATIONS

This application claims priority to China Application Serial Number 202110055442.6, filed on Jan. 15, 2021, which is herein incorporated by reference.

BACKGROUND

Field of the Invention

The invention relates to industrial devices monitoring, and more particularly to a method and a system for monitoring industrial devices.

Description of Related Art

All device data of an industrial device terminal may be sent to a cloud platform through the Industrial Internet of Things (IIoT), and may be processed by the cloud platform uniformly. However, since users may access the device data stored in the cloud platform at any place and any time, the current remote industrial devices monitoring system needs to transfer device data packets through a virtual private network (VPN) server to ensure the validity of the device data as well as the convenience of internet connections. However, both the industrial device terminal and the user terminal have to bear the maintenance fee of the VPN server in addition to the data fee, which results in an increasing of monitoring cost.

SUMMARY

One aspect of the invention is to provide a method for monitoring industrial devices. The method includes: sending, by a management device, a token request message to a cloud storage server; sending, by the cloud storage server, an address transfer message to the management device in response to the token request message; sending, by the management device, a login message to the cloud storage server according to a content of the address transfer message and login information; sending, by the cloud storage server, an authentication message to the management device after verifying that the login message is correct; sending, by the management device, an authorization pass message with an exchange code to the cloud storage server according to an authentication code in the authentication message; sending, by the cloud storage server, a response message with an access token to the management device after confirming the exchange code; sending, by a user apparatus, a certificate request message to the management device; performing, by the management device, a certificate verification on the user apparatus according to the certificate request message, and sending a certificate pass message with the access token to the user apparatus by the management device when the certificate verification is successful; sending, by the user apparatus, an access request message with the access token and identification information to the cloud storage server; and providing, by the cloud storage server, device data of an industrial device terminal to the user apparatus according to the access token and a privilege of the identification information.

In accordance with one or more embodiments of the invention, the method further includes: providing, by the management device, the access token to the industrial device terminal after obtaining the access token; and accessing, by the industrial device terminal, the cloud storage server by using the access token, so as to store the device data in the cloud storage server.

In accordance with one or more embodiments of the invention, the device data obtained by the user apparatus accessing the cloud storage server with different identification information are different.

In accordance with one or more embodiments of the invention, a graphic user interface displayed on the user apparatus corresponds to the privilege of the identification information.

In accordance with one or more embodiments of the invention, graphic interface data with the graphic user interface are provided to the user apparatus by the management device when the certification verification on the user apparatus is successful.

In accordance with one or more embodiments of the invention, the user apparatus displays the graphic user interface by executing a container application program.

In accordance with one or more embodiments of the invention, the certification verification on the user apparatus by the management device is performed in a condition in which the management device and the user apparatus in the same network domain.

Another aspect of the invention is to provide a system for monitoring industrial devices. The system includes a user apparatus, a cloud storage server and a management device. The cloud storage server is configured to receive an access request message with an access token and identification information from the user apparatus and to provide device data of an industrial device terminal to the user apparatus according to the access token and a privilege of the identification information. The management device includes a communication unit and a processor. The communication unit is configured to communicatively connect with the cloud storage server and the user apparatus. The processor is configured to perform the following operations: sending a token request message to the cloud storage server; receiving an address transfer message that is sent by the cloud storage server in response to the token request message; sending a login message to the cloud storage server according to a content of the address transfer message and login information; receiving an authentication message that is sent by the cloud storage server after verifying that the login message is correct; sending an authorization pass message with an exchange code to the cloud storage server according to an authentication code in the authentication message; receiving a response message with the access token that is send by the cloud storage server after confirming the exchange code; receiving an authorization request message that is sent by the user apparatus; and performing a certificate verification on the user apparatus according to the authorization request message, and sending a certificate pass message with the access token to the user apparatus when the certificate verification is successful.

In accordance with one or more embodiments of the invention, the processor of the management device is further configured to provide the access token to the industrial device terminal, and wherein the device data are stored in the cloud storage server after the industrial device terminal accesses the cloud storage server by using the access token.

In accordance with one or more embodiments of the invention, the device data obtained by the user apparatus accessing the cloud storage server with different identification information are different.

In accordance with one or more embodiments of the invention, a graphic user interface displayed on the user apparatus corresponds to the privilege of the identification information.

In accordance with one or more embodiments of the invention, the processor of the management device is further configured to generate corresponding graphic interface data according to privileges of identification information, and wherein the certificate pass message further comprises the graphic interface data corresponding to one of the privileges of the identification information of the user apparatus.

In accordance with one or more embodiments of the invention, the user apparatus displays the graphic user interface by executing a container application program.

In accordance with one or more embodiments of the invention, the certification verification is performed in a condition in which the management device and the user apparatus are in the same network domain.

In accordance with one or more embodiments of the invention, a transmission protocol between the management device and the user apparatus is Hypertext Transfer Protocol (HTTP), Hypertext Transfer Protocol Secure (HTTPS) or Message Queuing Telemetry Transport (MQTT).

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Figure 1:
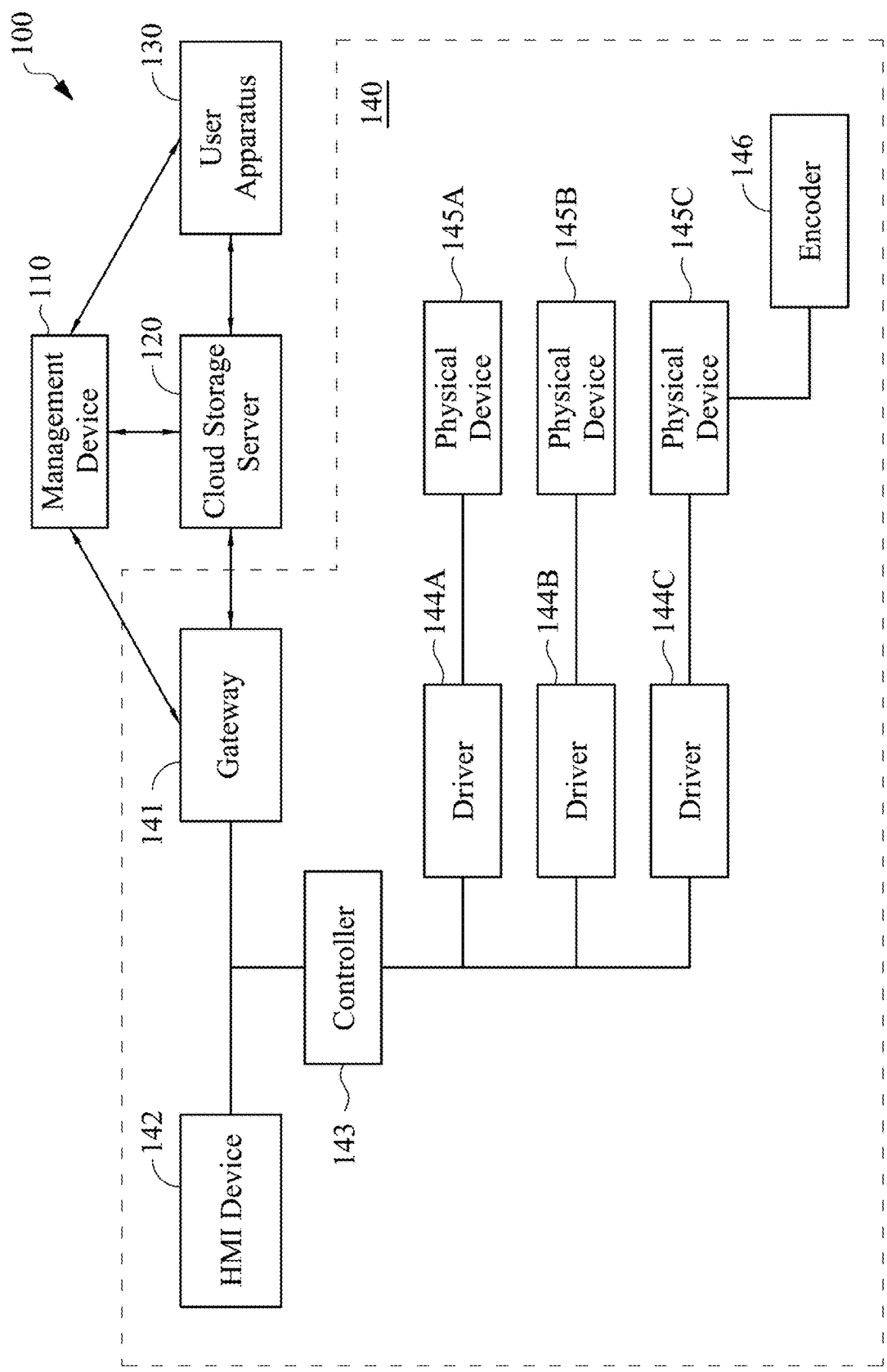
FIG. 1 is a system for monitoring industrial devices in accordance with one or more embodiments of the invention.

FIG. 1 is a system 100 for monitoring industrial devices in accordance with one or more embodiments of the invention. The system 100 includes a management device 110, a cloud storage server 120, a user apparatus 130 and an industrial device terminal 140. The management device 110, the cloud storage server 120, the user apparatus 130 and the industrial device terminal 140 may perform communicative connections and data transmissions with each other. The management device 110 and the user apparatus 130 without certification by the management device 110 need to be in the same network domain, while the cloud storage server 120, the industrial device terminal 140 and the management device 110 certificated by the user apparatus 130 may be in the same network domain or in different network domains. In addition, the communicative connections between the management device 110, the cloud storage server 120, the user apparatus 130 and the industrial device terminal 140 may be wired or wireless.

The management device 110 and the user apparatus 130 may be physical entities with communicative connection and data processing functions, and such physical entities include, but are not limited to, desktop computers, smartphones, laptop computers, etc. The cloud storage server 120 includes a server and a cloud disk. The server is used to provide specific services to a user, and the cloud disk can be used to store data and provide data to a client that accesses the server.

The industrial device terminal 140 includes a gateway 141, a human machine interface (HMI) device 142, a controller 143, drivers 144A-144C, physical devices 145A-145C and an encoder 146. The gateway 141 is an interface for the industrial device terminal 140 to connect with an external network. The HMI device 142 provides an interface for controlling industrial machines, and is used to collect device data of the industrial machines. The controller 143 is connected to the drivers 144A-144C, and the drivers 144A-144C are respectively connected with the physical devices 145A-145C. The controller 143 may be configured to generate a control signal and then transmits the control signal to the drivers 144A-144C, such that the drivers 144A-144C respectively drive the physical devices 145A-145C to work accordingly. The controller 143 may be a programmable logic controller (PLC). The physical devices 145A-145C may be, for example, servo motors, stepper motors, or any device that can be driven by the drivers 144A-144C. In an example in which the physical device 145C is a servo motor, the encoder 146 may be connected with the physical device 145C to convert the rotary speed and/or the rotational position of the servo motor into analog or digital data.

Figure 2:
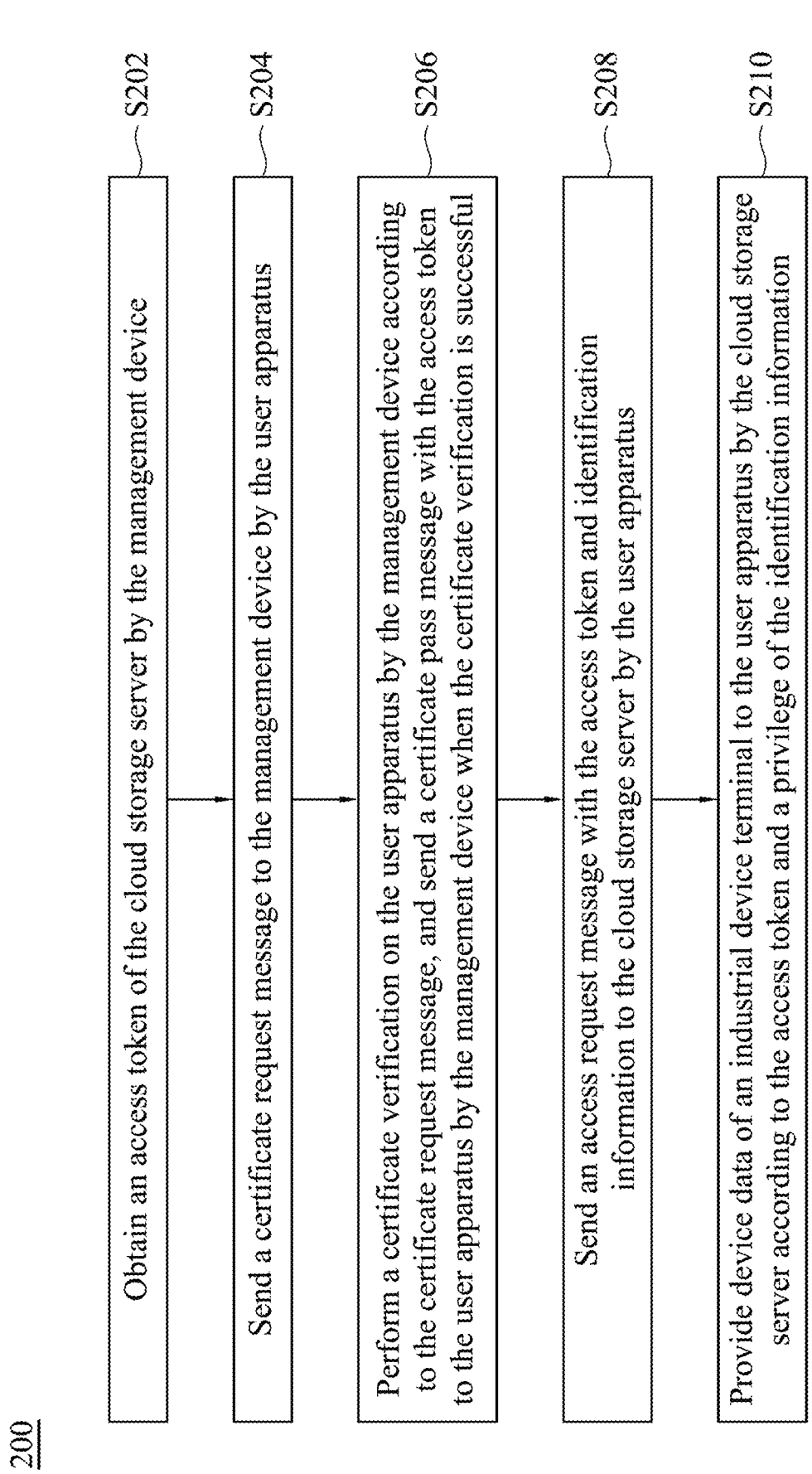
FIG. 2 is a flowchart of a method for monitoring industrial devices in accordance with one or more embodiments of the invention.

FIG. 2 is a flowchart of a method 200 for monitoring industrial devices in accordance with one or more embodiments of the invention. The method 200 may be applied to the system 100 or another similar system. The following takes the system 100 as an example for description. In the beginning, Step S202 is performed, in which the management device 110 obtains an access token of the cloud storage server 120. Then, Step S204 is performed, in which the user apparatus 130 sends a certificate request message to the management device 110. Afterwards, Step S206 is performed, in which the management device 110 performs a certificate verification on the user apparatus 130 according to the certificate request message, and sends a certificate pass message with the access token to the user apparatus 130 when the certificate verification is successful. Then, Step S208 is performed, in which the user apparatus 130 sends an access request message with the access token and identification information to the cloud storage server 120. Afterwards, Step S210 is performed, in which the cloud storage server 120 provides device data of the industrial device terminal 140 to the user apparatus 130 according to the access token and a privilege of the identification information.

Figure 3:
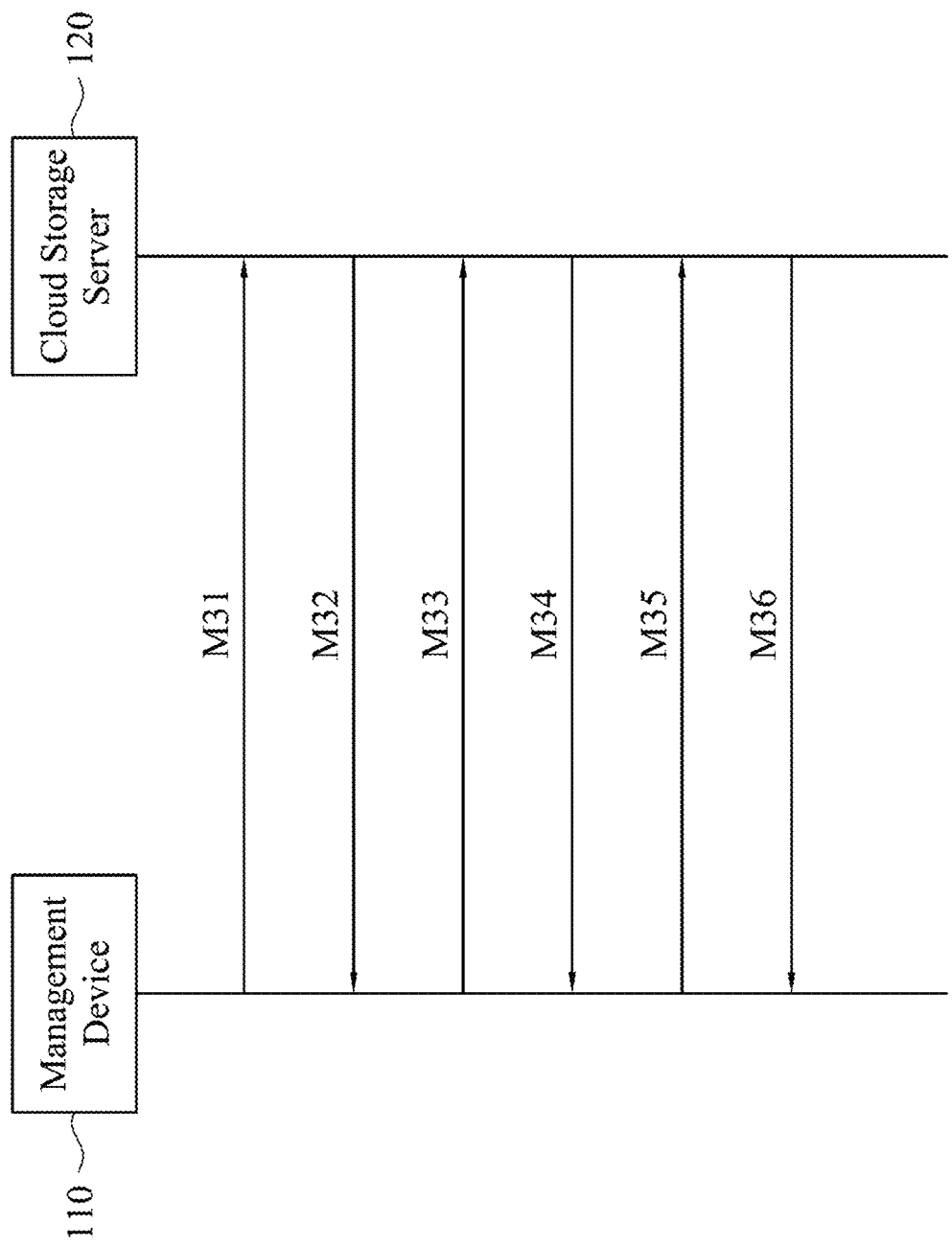
FIG. 3 is a message sequence chart for the system in FIG. 1 about obtaining an access token by the management device from the cloud storage server.

FIG. 3 is a message sequence chart for the system 100 in FIG. 1 about obtaining an access token by the management device 110 from the cloud storage server 120, which is a detailed flow of Step S202 in FIG. 2. At first, the management device 110 sends a token request message M31 to the cloud storage server 120 for requesting the cloud storage server 120 to provide a certificate message. Then, the cloud storage server 120 sends an address transfer message M32 to the management device 110 after receiving the token request message M31, such that the connection with the management device 110 is redirected to the address in the address transfer message M32. Afterwards, the management device 110 sends a login message M33 to the cloud storage server 120. The cloud storage server 120 verifies whether the login information of account and password in the login message M33 is correct and corresponds to a registered legal user after receiving the login message M33. If yes, then the cloud storage server 120 accepts the login request of the management device 110, and sends an authentication message M34 to the management device 110. Then, the management device 110 sends an authorization pass message M35 with an exchange code to the cloud storage server 120 according to an authentication code in the authentication message M34. At last, the cloud storage server 120 sends a response message M36 to the management device 110 after confirming the exchange code. The response message M36 includes an access token needed for accessing the cloud storage server 120. The management device 110 may send the access token to the HMI device 142 in the industrial device terminal 140 after obtaining the access token of the cloud storage server 120.

Figure 4:
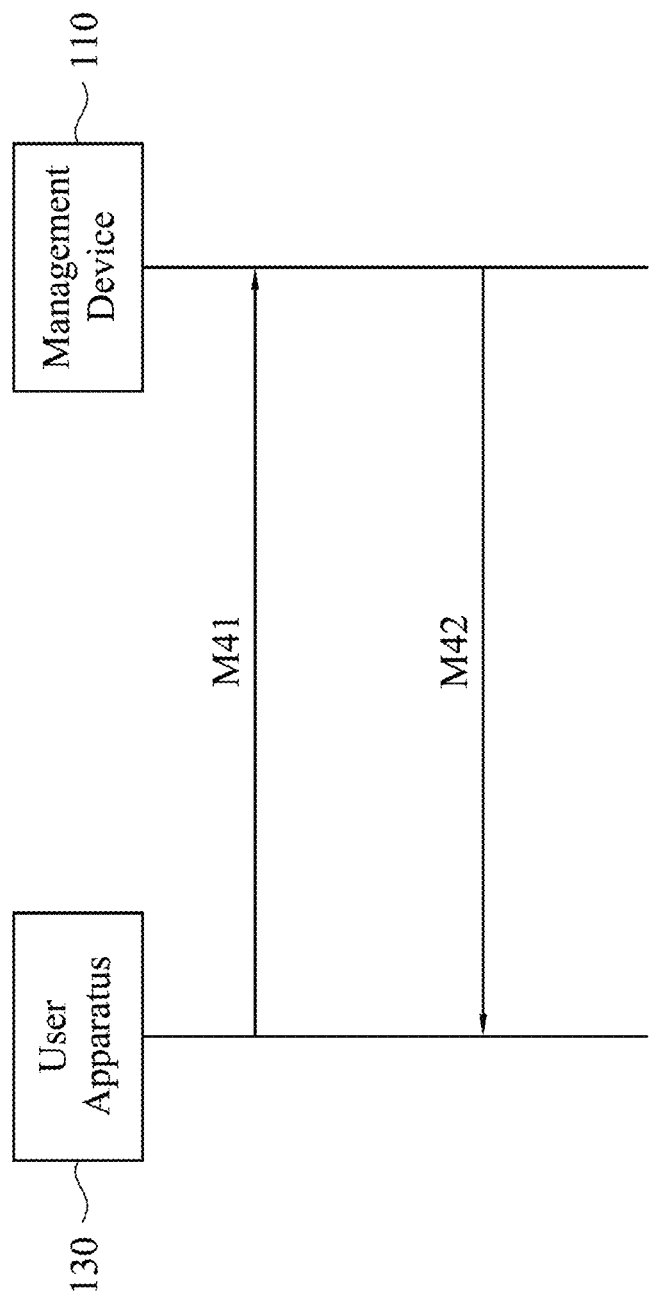
FIG. 4 is a message sequence chart for the system in FIG. 1 about performing a certificate verification on the user apparatus by the management device.

FIG. 4 is a message sequence chart for the system 100 in FIG. 1 about performing a certificate verification on the user apparatus 130 by the management device 110, which is a detailed flow of Steps S204 and S206 in FIG. 2. At first, the user apparatus 130 sends a certificate request message M41 to the management device 110. The management device 110 performs a certificate verification on the user apparatus 130 according to the certificate account and password in the certificate request message M41 after receiving the certificate request message M41. If the certificate account and password are valid, then the management device 110 sends a certificate pass message M42 to the user apparatus 130. The certificate pass message M42 includes the access token of the cloud storage server 120 and graphic interface data corresponding to the privilege of the identification information of the user apparatus 130. The transmission protocol between the management device 110 and the user apparatus 130 may be Hypertext Transfer Protocol (HTTP), Hypertext Transfer Protocol Secure (HTTPS), Message Queuing Telemetry Transport (MQTT), but is not limited thereto. In addition, the certification password may be encrypted by using an encryption method such as MD5 or SHA1 algorithm.

Figure 5:
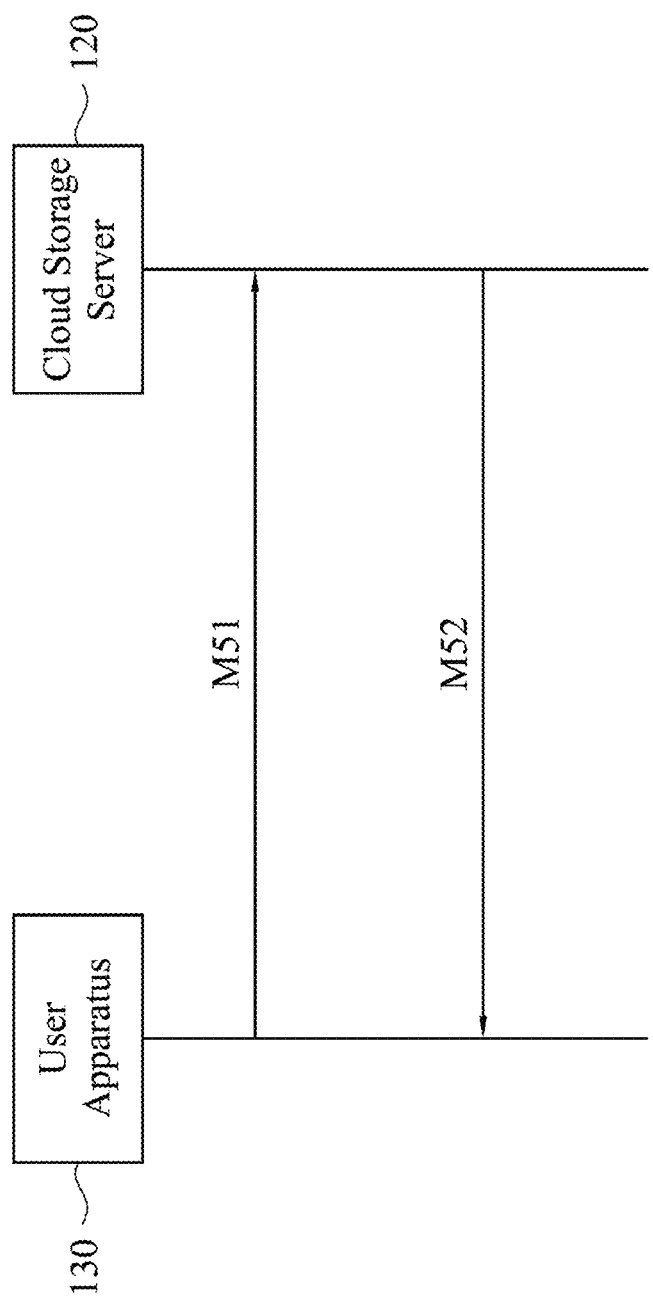
FIG. 5 is a message sequence chart for the system in FIG. 1 about accessing the cloud storage server by the user apparatus.

FIG. 5 is a message sequence chart for the system 100 in FIG. 1 about accessing the cloud storage server 120 by the user apparatus 130, which is a detailed flow of Steps S208 and S210 in FIG. 2. At first, the user apparatus 130 sends an access request message M51 to the cloud storage server 120. Then, the cloud storage server 120 sends after receiving a device data message M52 to the user apparatus 130 after receiving the access request message M51, such that the user apparatus 130 can display device data in the device data message M52. The device data provided by the cloud storage server 120 may be different depending on the privilege of the identification information of the user apparatus 130. For example, if the privilege of the identification information of the user apparatus 130 is the highest, then the cloud storage server 120 provides device data of all the industrial devices in the industrial device terminal 140 to the user apparatus 130. On the contrary, if the privilege of the identification information of the user apparatus 130 is not the highest, then the cloud storage server 120 provides, but is not limited to, all or some device data of some of the industrial devices in the industrial device terminal 140 to the user apparatus 130.

Figure 6:
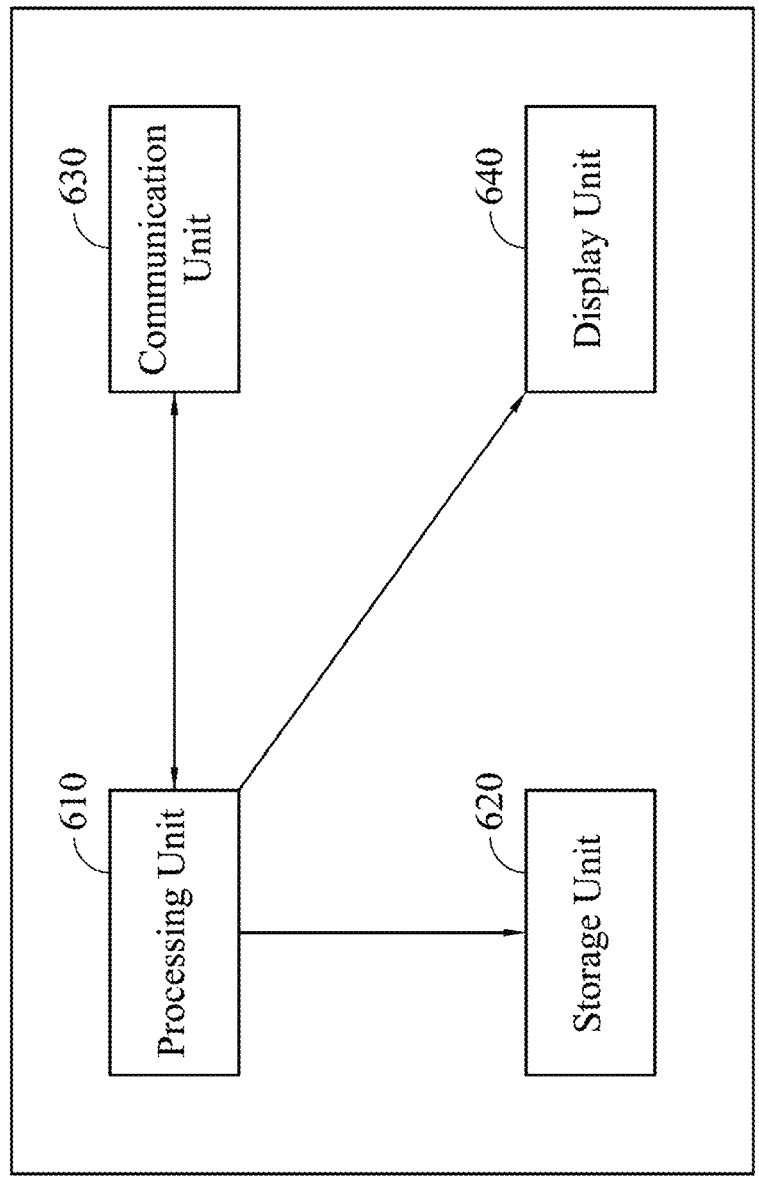
FIG. 6 illustrates a schematic diagram of a computer apparatus in accordance with some embodiments of the invention.

FIG. 6 illustrates a schematic diagram of a computer apparatus 600 in accordance with some embodiments of the invention. The computer apparatus 600 may be the management device 110 or the user apparatus 130 in FIG. 1, which includes a processing unit 610, a storage unit 620, a communication unit 630 and a display unit 640. The processing unit 610 may be a conventional processor), a multicore processor, a digital signal processor (DSP), a microprocessor or an application-specific integrated circuit (ASIC). In the embodiments of the invention, the method for monitoring industrial devices performed by the management device 110 and/or the user apparatus 130 may be compiled into computer program instructions, and the compiled computer program instructions are stored in the storage unit 620. The processing unit 610 may perform corresponding operations of the industrial devices monitoring method by executing the computer program instructions.

The storage unit 620 may be any data storage device that can be read and executed through the processing unit 610. The storage unit 620 may be read-only memory (ROM), EPROM, EEPROM, random access memory (RAM), CD-ROM, magnetic tape, hard disk, solid state disk (SSD), flash memory or another data storage device suitable for storing programming codes, but is not limited thereto. The storage unit 620 may further be used to store the access token or other data.

The communication unit 630 communicatively connects with a remote entity according to the computer program instructions executed by the processing unit 610. The communication unit 630 may be a wired or wireless transceiver, and may be used for internet connections.

The display unit 640 is coupled to the processing unit 610 for displaying images according to the operations of the processing unit 610. The display unit 640 may be, for example, a liquid crystal display, an electroluminescence display, or any apparatus capable of displaying images depending on the operations of the processing unit 610.

Figure 7:
FIG. 7 is an example of the graphic user interface of the user apparatus in FIG. 1.

FIG. 7 is an example of the graphic user interface of the user apparatus 130. The graphic user interface shown in FIG. 7 is a graph displayed by a display unit of the user apparatus 130 when an application program is executed. The application program executed by the user apparatus 130 may be a container application program, which can edit and display corresponding user-programmable graphic user interfaces according to the user apparatus 130. As shown in FIG. 7, the graphic user interface includes an upper main window and a lower icon row in which a cloud connection icon 710, an account switch icon 720, a main page display icon 730 and a settings icon 740 are from left to right in sequence. When the user clicks on the cloud connection icon 710, a communicative connection with the cloud storage server 120 can be performed. When the user clicks the account switch icon 720, the account currently logged in to the cloud storage server 120 can be logged out, and then another account can be used to log in to the cloud storage server 120, or the same account can be used to log in to the cloud storage server 120 again. When the user clicks on the main page display icon 730, the main window can jump back to a main display page. When the user clicks on the setting icon 740, the connection information of the management device 110 can be set up.

In the following, the contents displayed in the graphic user interface of the user apparatus 130 at various stages are described. First, after the user clicks the setting icon 740, if it is the first time to use, then the address and the login password of the management device 110 need to be input first, in order to receive the access token of the cloud storage server 120 from the management device 110 after successful login. The application program may provide an input information saving option, and the user can choose such option to enable the input information saving function. As such, when the application program is executed again, the user apparatus 130 does not need to input the address and the login password of the management device 110. In addition, the application program can provide an authentication information storing option, and the user can choose such option to enable the authentication information storing function. As such, when the application program is executed again, the user apparatus 130 does not need to connect to the management device 110.

After successfully obtaining the access token, the user can click on the cloud connection icon 710 to communicatively connect with the cloud storage server 120. The user apparatus 130 sends the access token to the cloud storage server 120, and after the cloud storage server 120 passes the certificate verification of the access token, the main window may display a prompt message about acquiring connection information, which means it is getting device information of the industrial device terminal 140 from the cloud storage server 120.

Various devices represented by icons can be displayed on the main window after the device information is successfully obtained. As shown in FIG. 7, the main window is divided into two windows, where the left window displays industrial device type icons, and the right window displays individual industrial device icons. For example, if the obtained device information includes information of two HMI devices in the industrial device terminal, then after clicking on the HMI device icon in the left window, two HMI device icons HMI_1 and HMI_2 are displayed in the right window. The user may click on an HMI device icon (e.g. HMI_2) to view the device information of a specific human-machine interface device. After clicking on an HMI device icon, a pop-up window will appear on the graphic user interface, asking the user to input the login account and login password to access the device data of the HMI device.

After the user enters the correct login account and login password, various graphical statistical data icons of the HMI device appear in the main window, which can correspond to histograms, pie charts, bar charts, line charts, trend charts, statistical process control (SPC) charts, regression analysis chart, cluster analysis chart, radar chart, and so on. In addition, due to the limited size of the graphic user interface, if the number of graphical statistical data icons exceeds the maximum number that can be displayed in the main window, then the graphical statistical data icons can be displayed respectively in multiple pages. In this example, the main window can display six graphical statistical data icons, and when the number of graphical statistical data icons exceeds the number that can be displayed in the main window, multiple page icons are displayed at the bottom of the main window, where the solid page icon represents the page currently displayed in the main window. If the user apparatus 130 supports touch display operation, then a specific page can be displayed through a horizontal sliding operation. When sliding to the second page, the main window displays graphical statistics icons that are different from those displayed in the first page. In other embodiments, the graphical statistics icons may also be displayed in the main window in a scroll mode or in a long page mode, and the scroll direction or the page direction may be horizontal or vertical.

In the embodiments of the invention, different users may have login accounts with different access privileges. If the access privilege corresponding to the login account is low, only a part but not all of the graphical statistical data icons will be displayed in the main window. In other words, if the access privilege corresponding to the login account is relatively low, then fewer graphical statistics icons will be displayed in the main window.

It is noted that the architecture of the system shown in FIG. 1 is merely an example and is not intended to limit the scope of the invention. For example, the system 100 may have multiple industrial device terminals, and each industrial device terminal may have multiple HMI devices and/or other industrial devices, which can be adjusted according to actual application requirements. Similarly, the graphic user interface shown in FIG. 7 is merely an example, and a program developer can change the appearance and window settings of the graphic user interface according to the above description and the contents shown in FIG. 7.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:
1. A method for monitoring industrial devices, the method comprising:
   sending, by a management device, a token request message to a cloud storage server;
   sending, by the cloud storage server, an address transfer message to the management device in response to the token request message;
   sending, by the management device, a login message to the cloud storage server according to a content of the address transfer message and login information;
   sending, by the cloud storage server, an authentication message to the management device after verifying that the login message is correct;
   sending, by the management device, an authorization pass message with an exchange code to the cloud storage server according to an authentication code in the authentication message;
   sending, by the cloud storage server, a response message with an access token to the management device after confirming the exchange code;
   sending, by a user apparatus, a certificate request message to the management device;
   performing, by the management device, a certificate verification on the user apparatus according to the certificate request message, and sending a certificate pass message with the access token to the user apparatus by the management device when the certificate verification is successful;
   sending, by the user apparatus, an access request message with the access token and identification information to the cloud storage server; and
   providing, by the cloud storage server, device data of an industrial device terminal to the user apparatus according to the access token and a privilege of the identification information.

2. The method of claim 1 further comprising:
providing, by the management device, the access token to the industrial device terminal after obtaining the access token; and
accessing, by the industrial device terminal, the cloud storage server by using the access token, so as to store the device data in the cloud storage server.

3. The method of claim 1, wherein the device data obtained by the user apparatus accessing the cloud storage server with different identification information are different.

4. The method of claim 1, wherein a graphic user interface displayed on the user apparatus corresponds to the privilege of the identification information.

5. The method of claim 4, wherein graphic interface data with the graphic user interface are provided to the user apparatus by the management device when the certification verification on the user apparatus is successful.

6. The method of claim 4, wherein the user apparatus displays the graphic user interface by executing a container application program.

7. The method of claim 1, wherein the certification verification on the user apparatus by the management device is performed in a condition in which the management device and the user apparatus in the same network domain.

8. A system for monitoring industrial devices, the system comprising:
a user apparatus;
a cloud storage server configured to receive an access request message with an access token and identification information from the user apparatus and to provide device data of an industrial device terminal to the user apparatus according to the access token and a privilege of the identification information; and
a management device comprising:
  a communication unit configured to communicatively connect with the cloud storage server and the user apparatus; and
  a processor configured to perform the following operations:
    sending a token request message to the cloud storage server;
    receiving an address transfer message that is sent by the cloud storage server in response to the token request message;
    sending a login message to the cloud storage server according to a content of the address transfer message and login information;
    receiving an authentication message that is sent by the cloud storage server after verifying that the login message is correct;
    sending an authorization pass message with an exchange code to the cloud storage server according to an authentication code in the authentication message;
    receiving a response message with the access token that is send by the cloud storage server after confirming the exchange code;
    receiving an authorization request message that is sent by the user apparatus; and
    performing a certificate verification on the user apparatus according to the authorization request message, and sending a certificate pass message with the access token to the user apparatus when the certificate verification is successful.

9. The system of claim 8, wherein the processor of the management device is further configured to provide the access token to the industrial device terminal, and wherein the device data are stored in the cloud storage server after the industrial device terminal accesses the cloud storage server by using the access token.

10. The system of claim 8, wherein the device data obtained by the user apparatus accessing the cloud storage server with different identification information are different.

11. The system of claim 8, wherein a graphic user interface displayed on the user apparatus corresponds to the privilege of the identification information.

12. The system of claim 11, wherein the processor of the management device is further configured to generate corresponding graphic interface data according to privileges of identification information, and wherein the certificate pass message further comprises the graphic interface data corresponding to one of the privileges of the identification information of the user apparatus.

13. The system of claim 11, wherein the user apparatus displays the graphic user interface by executing a container application program.

14. The system of claim 8, wherein the certification verification is performed in a condition in which the management device and the user apparatus are in the same network domain.

15. The system of claim 8, wherein a transmission protocol between the management device and the user apparatus is Hypertext Transfer Protocol (HTTP), Hypertext Transfer Protocol Secure (HTTPS) or Message Queuing Telemetry Transport (MQTT).

* * * * *